(12) United States Patent
Rhoads et al.

(10) Patent No.: US 9,874,911 B2
(45) Date of Patent: Jan. 23, 2018

(54) APPARATUS AND METHOD FOR RESETTING TO FACTORY DEFAULT WITH BOOTLOADER PROGRAM

(71) Applicant: THOMSON LICENSING, Issy de Moulineaux (FR)

(72) Inventors: Steven C Rhoads, Carmel, IN (US); Marc David Ziems, Carmel, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/967,787

(22) Filed: Dec. 14, 2015

(65) Prior Publication Data

US 2017/0168533 A1 Jun. 15, 2017

(51) Int. Cl.
*G06F 1/24* (2006.01)
*G06F 1/32* (2006.01)
*G06F 9/44* (2006.01)

(52) U.S. Cl.
CPC .............. *G06F 1/24* (2013.01); *G06F 1/3287* (2013.01); *G06F 9/4401* (2013.01); *G06F 9/4406* (2013.01)

(58) Field of Classification Search
CPC ......... G06F 1/24; G06F 1/3287; G06F 9/4401
USPC ........................................................... 713/2
See application file for complete search history.

(56) References Cited

U.S. PATENT DOCUMENTS

| 8,892,859 B1 * | 11/2014 | Eny | ...................... G06F 11/1441 377/82 |
|---|---|---|---|
| 2004/0059905 A1 | 3/2004 | Soldier | |
| 2005/0273585 A1 * | 12/2005 | Leech | ...................... G06F 1/24 713/1 |
| 2006/0242331 A1 | 10/2006 | Yamada et al. | |
| 2014/0115354 A1 * | 4/2014 | Jabbaz | ...................... G06F 1/266 713/310 |
| 2014/0304496 A1 | 10/2014 | Imamura | |

(Continued)

FOREIGN PATENT DOCUMENTS

| CN | 101605387 | 12/2009 | | |
|---|---|---|---|---|
| JP | 2006302092 | 11/2006 | | |
| TW | 201001285 A | * | 6/2008 | ............. G06F 9/445 |

OTHER PUBLICATIONS

Greywolf, "How do I reset my router hardware to the default settings," DSL Reports, 3 pages, last modified on the Internet: Dec. 14, 2010, http://www.dslreports.com/faq/2094.

(Continued)

*Primary Examiner* — Vincent Tran
(74) *Attorney, Agent, or Firm* — Brian J. Dorini; Patricia A. Verlangieri

(57) ABSTRACT

The present principle generally relate to resetting of an electronic device, and particularly, to resetting of an electronic device to factory default of settings if a reset button is pressed for more than a certain amount of time such as, e.g., ten seconds. The amount of time the reset button is pressed is monitored by a bootloader program after a reboot of the processor. The present principles allow the use of the same reset button for two different functions: a normal power off-on reset and a reset to the factory default. The present principles also allow the electronic device to be reset to the factory default even if the main software of the electronic device is locked up (i.e., non-functioning).

15 Claims, 4 Drawing Sheets

(56) References Cited

U.S. PATENT DOCUMENTS

| | | | | |
|---|---|---|---|---|
| 2014/0320630 A1* | 10/2014 | Xiao | ..................... | G01M 15/02 |
| | | | | 348/82 |
| 2015/0378385 A1* | 12/2015 | Rana | ........................ | G05F 3/16 |
| | | | | 327/143 |
| 2016/0056999 A1* | 2/2016 | Na | ..................... | H04L 41/0672 |
| | | | | 398/1 |

OTHER PUBLICATIONS

LINKSYS—Official Support, "Resetting your router and changing the router admin password," 4 pages, retrieved from the Internet on Oct. 1, 2015, http://www.linksys.com/hk/support-article?articleNum=139791.

Isabel M, "Reselling an Android Phone From the Hardware," 3 pages, last updated on Jun. 2, 2015, retrieved from the Internet on Oct. 1, 2015, https://help.ting.com/hc/en-us/articles/205420428-Re-setting-an-Android . . . .

* cited by examiner

```
time1 = RealTimeClockValue();   //in us?

for(;;) {                        //Keep reading RED_RESET_GPIO as long as it is pressed gpioRedReset = ReadGPIO(RED_RESET_GPIO);

if (gpioRedReset == 1)   //Not being pressed break;                   //Stop checking READ_RESET_GPIO }                                //Else keep reading GPIO value time2 = RealTimeClockValue();

if (time2 – time1 > TEN_SECONDS) {

FactoryDefaultSettings();    //Clear user settings in NOR flash

… # APPARATUS AND METHOD FOR RESETTING TO FACTORY DEFAULT WITH BOOTLOADER PROGRAM

BACKGROUND

Field of the Invention

The present principle generally relate to resetting of an electronic device, and particularly, to resetting of an electronic device to factory default of settings if a reset button is pressed for more than a certain amount of time such as, e.g., ten seconds. The amount of time the reset button is pressed is monitored by a bootloader program after a reboot of the processor. The present principles allow the use of the same reset button for two different functions: a normal power off-on reset and a reset to the factory default. The present principles also allow the electronic device to be reset to the factory default even if the main software of the electronic device is locked up (i.e., non-functioning).

Background Information

This section is intended to introduce a reader to various aspects of art, which may be related to various aspects of the present principles that are described and/or claimed below. This discussion is believed to be helpful in providing the reader with background information to facilitate a better understanding. Accordingly, it should be understood that these statements are to be read in this light, and not as admissions of prior art.

An electronic device such as a PC, a cellphone, a tablet, a television receiver (including a set top box), and etc., usually includes a way for a user to reset the device. Typically a device may be reset by turning on and off the power supply to the electronic device. This is described as a normal power off-on reset as used herewith. After the normal power off-on reset, the device will be rebooted and user-entered settings stored in persistent memory such as ROM will stay the same and are not erased. On the contrary, there is also a factory default reset, which will reset the electronic device back to the settings provided at the factory before any user customization of the device. The factory settings of an electronic device are also the same settings as when the device is sold or shipped to an end user.

Booting (or booting up) is an initialization of a computerized system. A computerized system may be an electronic device such as a computer or a processor-controlled consumer electronic device. The booting or boot of an electronic device is complete when the normal, operative, runtime environment is attained. A bootloader program of an electronic device is the first program which executes (before the main program) whenever a system is initialized, booted or rebooted. In a personal computer (PC), it is first booted up and is then used to boot up and load the main program which is the operating system of the PC. Similarly, in the case of an electronic device such as a video receiver, a bootloader program boots and loads the main control program of a processor of the electronic device. The main program, once loaded, would then control the various components and functions of the electronic device in the normal, operative, runtime environment.

SUMMARY

The present principles recognize that there is a need to improve the existing method and system of providing a reset switch which can serve both as a factory reset and a normal power off-on reset for an electronic device. The present principles also recognize the need for allowing an electronic device to be reset to the factory default even if the main software of the electronic device is locked up or otherwise non-functioning. Accordingly, the present principles provide for resetting of an electronic device to factory default if a reset switch is pressed for more than a certain amount of time, such as, e.g., ten seconds, by using a bootloader program of a processor to monitor the state of the reset switch after a processor reboot.

Therefore, according to an exemplary embodiment, an electronic device is presented, comprising: a reset switch; a processor; a power supply supplying power to the processor; the processor having an input for determining a state of the reset switch using a bootloader program; and the reset switch is coupled to a control terminal of the power supply and when the reset switch is activated, the power supply cycles off then on causing the processor to reboot from the bootloader program and the state of the reset switch is monitored by the bootloader program after the reboot of the processor to determine an amount of time the reset switch is an on state.

Accordingly to another exemplary embodiment, an electronic device is presented, comprising: a reset switch; a processor; a one shot circuit coupled to the reset switch and for providing an output one shot signal in response to an activation of the reset switch; the processor having an input for determining a state of the reset switch using a bootloader program; and wherein the output one shot signal reboots the processor and the state of the reset switch is monitored by the bootloader program after the reboot of the processor to determine an amount of time the reset switch is an on state.

In another exemplary embodiment, a method performed by an electronic device is presented, comprising: executing a bootloader program by a processor, wherein the bootloader program is for booting and rebooting of the electronic device; monitoring by the bootloader program a state of a reset switch of the electronic device after a reboot of the processor by activating the reset switch causing a power supply of the processor to cycle off then on; and determining by the bootloader program an amount of time the reset switch is in an on state after the reboot of the processor.

In another exemplary embodiment, a computer program product for a bootloader program of an electronic device wherein the bootloader program is executed in response to an activation of a reset switch, stored in non-transitory computer-readable storage media, comprising computer-executable instructions for: monitoring by the bootloader program a state of the reset switch of the electronic device after a reboot of a processor by the activation of the reset switch causing a power supply of the processor to cycle off then on; and determining by the bootloader program an amount of time the reset switch is in an on state after the reboot of the processor.

DETAILED DESCRIPTION OF THE DRAWINGS

The above-mentioned and other features and advantages of the present principles, and the manner of attaining them, will become more apparent and the invention will be better understood by reference to the following description of embodiments of the present principles taken in conjunction with the accompanying drawings, wherein:

FIG. 4 shows a portion of an exemplary bootloader program according to the present principles.

Figure 1:
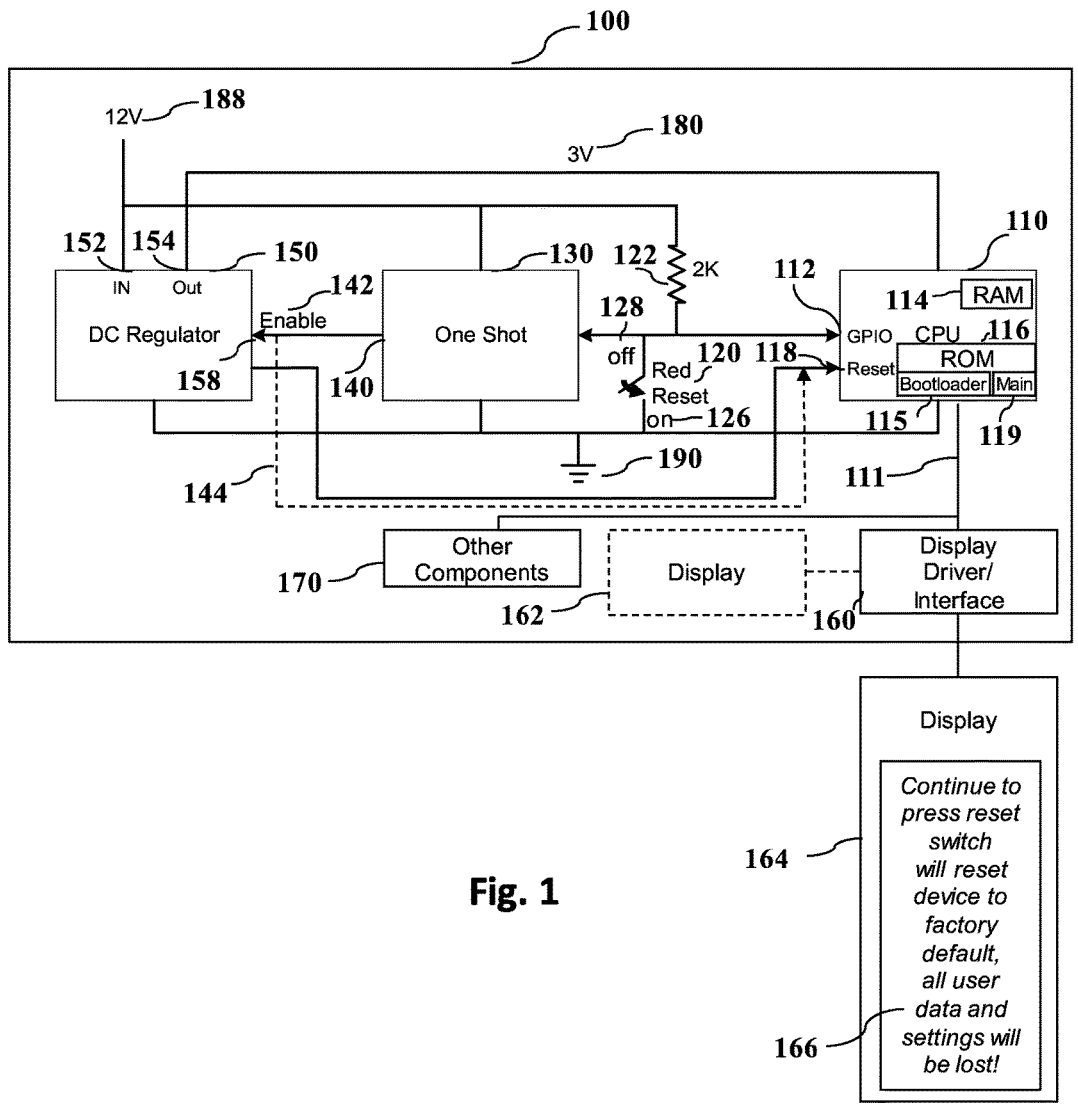
FIG. 1 shows an exemplary apparatus according to the present principles.

The examples set out herein illustrate exemplary embodiments of the present principles. Such examples are not to be construed as limiting the scope of the invention in any manner.

DETAILED DESCRIPTION

In accordance with the present principles, an electronic device such as a DirecTV receiver Model No. C61W, is to be implemented such that if a reset button is held for more than a value, e.g., 10 seconds, then the receiver will be reset to factory default. That is, the settings of the receiver will be restored to the condition at the time the device leaves the factory and is ready for sale and/or to be delivered to an end user. Factory reset also requires erasing the settings and data entered by a user of the electronic device after the user has taken the possession of the device.

On the other hand, if the reset button is held for less than 10 seconds, the receiver will reboot to a normal operating condition without resetting the receiver to the settings of the factory default. The reset button in accordance with the present principles also operates without the support of the main software program of the electronic device since the main software program may be in a lockup state, or is otherwise unable to perform its function of controlling the device.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventors to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment", "an embodiment", "an exemplary embodiment" of the present principles, or as well as other variations thereof, means that a particular feature, structure, characteristic, and so forth described in connection with the embodiment is included in at least one embodiment of the present principles. Thus, the appearances of the phrase "in one embodiment", "in an embodiment", "in an exemplary embodiment", or as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

FIG. 1 shows a representative hardware block diagram of an exemplary electronic device 100 in accordance with the present principles. Exemplary device 100 comprises a CPU processor 110 for processing various program codes, settings and data, and for controlling various functions and components of the device 100. Besides the components specifically shown in FIG. 1 and are to be described further below, other components such as communication interfaces, including wired and wireless interfaces, other user interface devices, such as a mouse or a keyboard, a cooling fan, and etc. of the device 100 are represented by block 170 shown in FIG. 1. These and other components of the electronic device 100 communicate with and are controlled by processor 110 via a processor communication bus 111 as shown in FIG. 1.

An electronic device 100 in FIG. 1 comprises an exemplary reset switch 120 (e.g., in red color and labeled as "Red Reset"). One example of a reset switch 120 is a push button switch which may be pressed by a user of the device 100 to activate a reset. In one exemplary embodiment, when pressed by the user, the switch 100 is in the on state 126, and when not pressed by the user, the switch is in the off state 128. However, other types of switches may also be used as well known in the art. The reset switch 120 in FIG. 1 is coupled to a 12V DC main power supply 188 via a resistor 122, and to ground 190. The reset switch 120 is also connected to a one shot circuit 130 of device 100. The reset switch 120 is further connected to a general purpose input output (GPIO) port 112 of processor 110.

The electronic device 100 also comprises a DC regulator/power supply 150 to supply a 3V DC power to the processor 110. The 3V DC power supply is derived from the main 12 V DC power supply input at terminal 152 of the regulator/power supply 150. The DC regulator/power supply 150 regulates and supplies the 3V DC power 180 to the processor 110 via a voltage output terminal 154 of the DC regulator/power supply 150 as shown in FIG. 1.

According to the present principles, when the reset switch 120 is activated (i.e., the switch is pressed by a user), it causes the one shot circuit 130 to send a one shot "Enable" signal 142 to a control terminal 158 of the DC regulator/power supply 150 of device 100, as shown in FIG. 1. When the enable signal 142 is high during the duration of the one shot signal 142, it causes the DC regulator 150 to turn off the 3V DC power supply 180 to the processor 110. Therefore, the one shot signal 142 cuts off the 3V DC supply power to the processor 110 during the duration of the one shot signal 142. The one shot signal 142 also causes the DC regulator 150 to send a reset signal 118 to the processor 110, thus holding the processor 110 at a reset state during the duration of the one shot signal 142.

After the one shot signal 142 has passed (i.e., becomes low), the DC regulator 150 restores the 3V DC supply power to processor 110 and the processor 110 reboots. Therefore, the 3V DC power supply 180 from the DC regulator 150 cycles off then on as described above in response to the one shot enable signal 142, and causes the processor 110 to reboot. At the reboot, processor 110 executes a bootloader program 115 which is stored in a persistent or non-transitory memory such as ROM 116 shown in FIG. 1. In one exemplary embodiment, the exemplary ROM 116 may be a NOR flash memory.

The processor 110 boots and/or reboots first with the bootloader program 115, and the bootloader program 115 then loads a main control program 119 and transfers control to the main control program 119, so that the processor 110 of the electronic device 100 executes the main control program 119 to control the various functions and components of the electronic device 100 in the normal, operative, runtime environment. For example, as is well known in the art, the processor 110 will execute the bootloader program when the device 100 is first powered on, including a reset. In one exemplary embodiment, the processor 110 when powered on, starts code execution at a certain memory address such as 0x00000000 which points to the bootloader codes in the ROM memory 116. These bootloader codes perform various initializations, including setting up memory protection, system stacks and I/O devices. The bootloader program 115 also has the memory address information of the operating system which allows the boot loader program 115 to then load the main control program 119 and transfers control of the electronic device 100 to the main control program 119.

In an alternate exemplary embodiment as shown in FIG. 1, the one shot output signal 142 from the one shot circuit 130 may be connected directly to the reset input 118 of the processor 110 through a connection 144 (shown as a dashed line), without connecting to the enable input 158 of the DC regulator 150. In this alternative embodiment according to the present principles, the output one shot signal 142 therefore will reboot or reset processor 110, without causing the 3V DC power supply 180 of the processor 110 from DC regulator 150 to shut off.

Also as shown in FIG. 1, processor 110 has a general purpose input/output (GPIO) pin 112 which is connected to the reset switch 120 for monitoring the on/off state of the reset switch 120 using the bootloader program 115 when the processor initially boots or reboots up. The bootloader program 115 also determines the amount of time the reset switch 120 is in the on state after the booting or rebooting of the processor 110. In accordance with the present principles, if the amount of time the reset switch is in the on state is greater than a value as determined by the bootloader program 115, then the bootloader program 115 resets the electronic device 100 to factory default. The electronic device 100 is then booting to the normal, operative, running environment.

On the other hand, if the amount of time the reset switch 120 is in the on state is not greater than a value as determined by the bootloader program 115, then the bootloader program 115 reboots the electronic device 100 in a normal power up mode without resetting the electronic device 100 to factory default and the electronic device 100 is booting to the normal, operative, running environment. In one exemplary embodiment, the value is 10 seconds. In another exemplary embodiment, since the power cycle time of the DC regulator 150 is about 2 seconds and the boot to code running time (i.e., when the bootloader program 115 is active and able to monitor the state of the switch 120) of the device 100 is about another 2 seconds, the threshold value the bootloader program 115 will use to determine the on time of the reset switch 120 after the reboot is 6 seconds, so that the total time the switch is pressed or being on is at least 10 seconds (i.e., 2+2+6=10 seconds), before a reset to the factory default is entered into.

An exemplary electronic device 100 may also comprise a display device as shown in FIG. 1. For example, the electronic device 100 may have an internal display device 162 which is a part of the device 100, and/or an external display device 164 as shown in FIG. 1. The display devices 162 and 164 may be driven by a display driver/interface component 160 under the control of processor 110 via the processor communication bus 111 as shown in FIG. 1. The type of the displays 162 and 164 may be, e.g., LCD (Liquid Crystal Display), LED (Light Emitting Diode), OLED (Organic Light Emitting Diode), and etc. The display devices 162 or 164 may also have touch screen input capabilities.

According to the present principles, in an exemplary embodiment, the bootloader program 115 is further configured to provide a display signal to a display device (e.g., 162 or 164) indicating to a user that the reset switch 120 is currently being pressed (e.g., in the on state) and if the reset switch 120 is continued to be pressed, the electronic device 100 will be reset to factory default and the user-entered data and settings will be erased. An exemplary display signal 166 according to this embodiment is illustrated as being displayed on an external display device 164 of FIG. 1. In another exemplary embodiment, the display signal may also include how much longer the user must hold the reset switch 120 for the factory default reset to occur.

Figure 2:
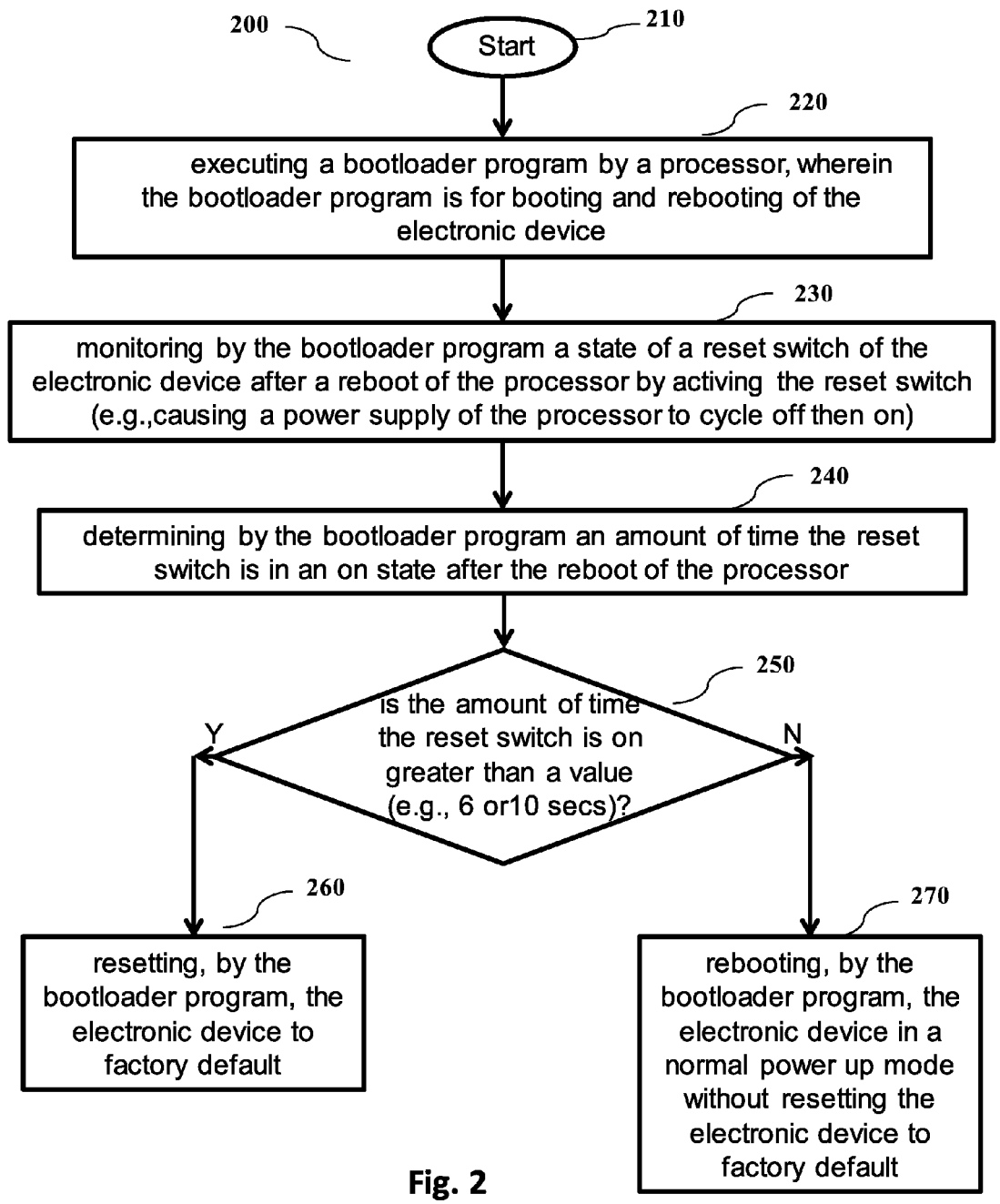
FIG. 2 shows an exemplary process according to the present principles.

FIG. 2 represents a flow chart diagram of an exemplary process 200 according to the present principles. Process 200 may be implemented as a computer program product comprising computer executable instructions which may be executed by e.g., a processor 110 of an exemplary electronic device 100 of FIG. 1. The computer program product having the computer-executable instructions may be stored in non-transitory computer-readable storage media as represented by e.g., memory 116 of FIG. 1. One skilled in the art can readily recognize that although memory 116 and memory 115 are shown in FIG. 1 as being integrated as part of a system on the chip (SoC) including the processor 110, in other exemplary embodiments, memory 116 and memory 115 may not have to be so integrated and may be external to a chip encompassing the processor 110.

At step 220 of FIG. 2, a bootloader program 115 is executed by a processor 110 as described above in connection with the exemplary electronic device 100 shown in FIG. 1. The bootloader program 115 is for booting and rebooting of the electronic device 100 as described above. At step 230 of FIG. 2, the bootloader program 115 monitors a state of a reset switch 120 of the electronic device 100 after a reboot of the processor 110 in response to the activation the reset switch 120. As discussed above, in one exemplary embodiment, the activation of the reset switch 120 causes the 3V DC power supply 180 of the processor 110 to cycle off then on so the processor 110 is rebooted. This is in response to a one shot enable signal 142 generated by a one shot circuit 130 connected to the reset switch 120 as described previously in connection with FIG. 1. Also as discussed above, in an alternate exemplary embodiment as shown in FIG. 1, the one shot output signal 142 may be directly connected to the reset input 118 of the processor 110 through an alternate connection 144 to reboot or reset processor 110, without turning off the 3V DC power supply of the processor 110.

At step 240 of FIG. 2, the bootloader program 115 determines an amount of time the reset switch is in an on state after the reboot of the processor 110. At step 260, if the amount of time the reset switch 120 is on is greater than a value (e.g., 6 or 10 secs) as determined in the decision step 250, then the bootloader program 115 erases the user-entered data and settings, and resets the electronic device 100 to the settings of the factory default. The electronic device 100 is then booting to the normal, operative, running environment. On the other hand, at step 270, if the amount of time the reset switch 120 is on is not greater than a value (e.g., 6 or 10 secs) as determined in the decision step 250, the bootloader program 115 reboots the electronic device 100 in a normal power up mode without resetting the electronic device 100 to factory default (i.e., not erasing the user-entered data and settings) and the electronic device 100 is then booting to the normal, operative, running environment.

Figure 3:
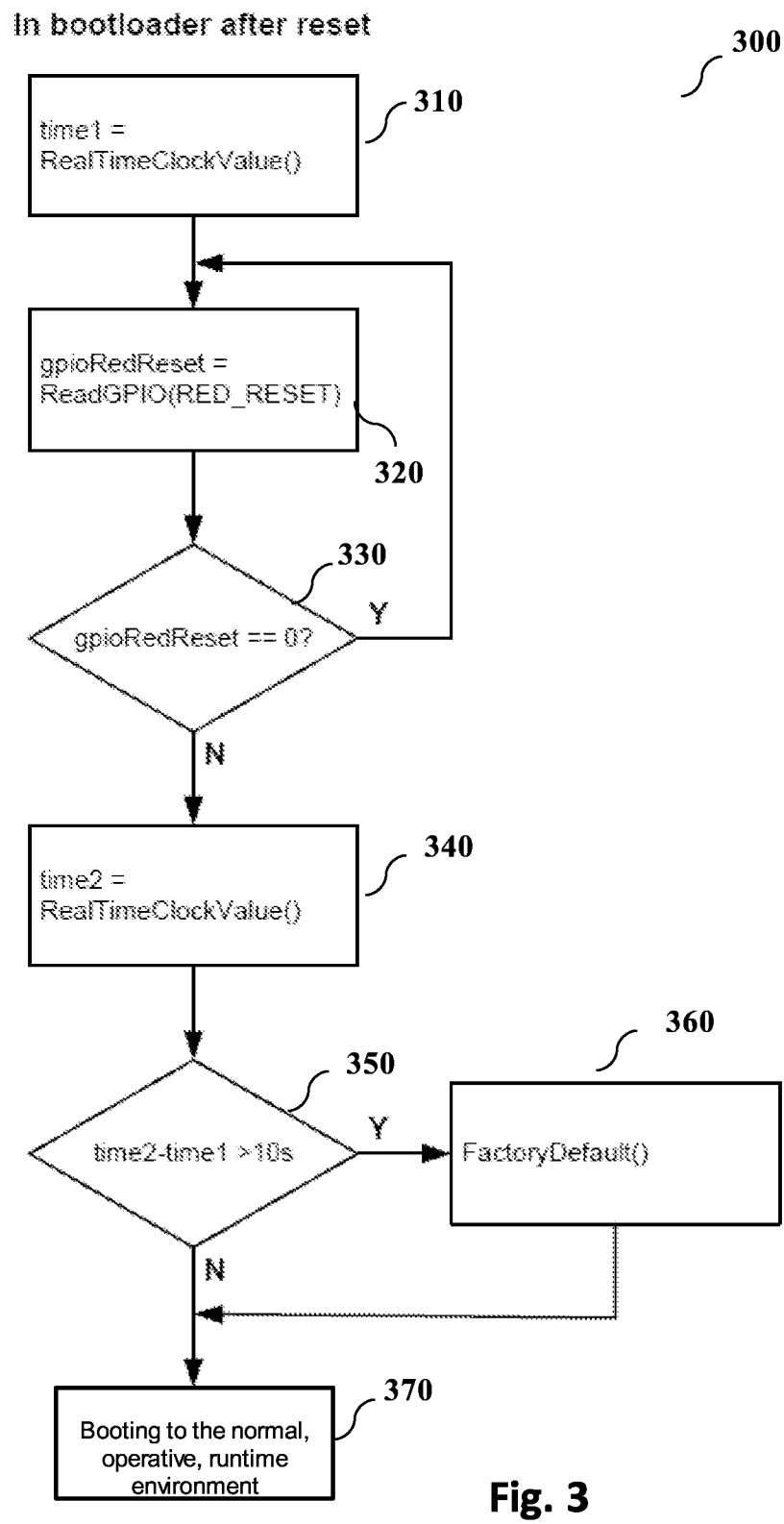
FIG. 3 shows another exemplary process according to the present principles.

FIG. 3 represents a flow chart diagram of another exemplary process 300 according to the present principles. In particular, the exemplary process 300 represents how an exemplary bootloader program 115 monitors the state of the reset switch 120 in FIG. 1 and determines the amount of time the reset switch 120 is pressed by a user or is on as described above. At step 310, a first variable, "timer1", of a free running timer is set to the real time clock value of the electronic device 100, for example, by call the function RealTimeClockValue( ). At steps 320 and 330, the state of the reset switch 120 at the input I/O port 112 of the processor 110 is read, monitored and determined. If the state of the reset switch 120 is pressed or on (i.e., "gpioRedReset"=0, as determined in decision step 330), the process goes back to step 320 to read the current state of the reset switch, gpioRedReset, for example, by calling the function ReadGPIO (RED_RESET). This is achieved by reading the GPIO input port 112. If the state of the reset switch is not pressed or off (i.e., "gpioRedReset" not=0, as determined in decision step 330), then a second variable of the free running timer, "timer2", is set at step 340 to the current value of the real time clock. At step 350, if the value of "timer2−time1," which represents the duration of the on time of the reset switch, is greater than a threshold value, then the electronic device 100 is reset to factory default at step 360 and is booting to the normal, operative, runtime environment at step 370. Although the exemplary threshold value shown at step 350 of FIG. 3 is 10 seconds, other threshold values may be used as needed by a particular system design or requirement, as already discussed above. For example, as described above, one may take into account the power cycle time of the DC regulator 150 and the boot to code running time of the device 100 and set the threshold value to be 6 seconds so that the total time the reset switch is pressed or on is at least 10 seconds (i.e., 2+2+6=10 seconds).

Continuing at step 370 of FIG. 3, if the value of "timer2−time1" is not greater than a threshold value as determined in decision step 350, then the electronic device 100 is booting in a normal power up mode to the normal, operative, runtime environment at step 370. The exemplary process 300 described above and shown in FIG. 3 is also shown in FIG. 4 as exemplary pseudo codes.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present embodiments. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings herein is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereof, the embodiments disclosed may be practiced otherwise than as specifically described and claimed. The present embodiments are directed to each individual feature, system, article, material and/or method described herein. In addition, any combination of two or more such features, systems, articles, materials and/or methods, if such features, systems, articles, materials and/or methods are not mutually inconsistent, is included within the scope of the present embodiment.

The invention claimed is:

1. An electronic device comprising:
a reset switch;
a processor;
a power supply supplying power to the processor;
the processor having an input for determining a state of the reset switch using a bootloader program; and
the reset switch is coupled to a control terminal of the power supply and when the reset switch is activated, the power supply cycles off then on causing the processor to reboot from the bootloader program and the state of the reset switch is monitored by the bootloader program after the reboot of the processor to determine an amount of time the reset switch is in an on state, wherein the bootloader program is configured to provide a display signal indicating to a user that the reset switch is in the on state and wherein the display signal further indicates that if the reset switch continues to be in the on state, the electronic device will be reset to factory default.

2. The electronic device of claim 1, further comprising a one shot circuit connected to the reset switch.

3. The electronic device of claim 2 wherein the one shot circuit is configured to provide a one shot signal to the control terminal of the power supply when the reset switch is activated.

4. The electronic device of claim 3 wherein the one shot signal causes the power supply to cycle off then on.

5. The electronic device of claim 1 wherein the bootloader program is stored in NOR flash memory.

6. The electronic device of claim 1 wherein the value is one of 1) 6 seconds and 2) 10 seconds.

7. A method performed by an electronic device comprising:
    executing a bootloader program by a processor, wherein the bootloader program is for booting and rebooting of the electronic device;
    monitoring by the bootloader program a state of a reset switch of the electronic device after a reboot of the processor by activating the reset switch causing a power supply of the processor to cycle off then on; and
    determining by the bootloader program an amount of time the reset switch is in an on state after the reboot of the processor, wherein the bootloader program provides a display signal indicating to a user that the reset switch is in the on state and wherein the display signal further indicates that if the reset switch continues to be in the on state, the electronic device will be reset to factory default.

8. The method of claim 7, wherein a one shot circuit is coupled to the reset switch.

9. The method of claim 8 further comprising providing a one shot signal from the one shot circuit to a control terminal of the power supply of the processor when the reset switch is activated.

10. The method of claim 9 wherein the one shot signal causes the power supply to cycle off then on.

11. The method of claim 7 wherein the bootloader program is stored in NOR flash memory.

12. The method of claim 7 wherein the value is one of 1) 6 seconds and 2) 10 seconds.

13. The method of claim 7 wherein the resetting of the electronic device to factory default is performed without intervention of a main control program of the electronic device.

14. A computer program product for a bootloader program of an electronic device wherein the bootloader program is executed in response to an activation of a reset switch, stored in non-transitory computer-readable storage media, comprising computer-executable instructions for:
    monitoring by the bootloader program a state of the reset switch of the electronic device after a reboot of a processor by the activation of the reset switch causing a power supply of the processor to cycle off then on; and
    determining by the bootloader program an amount of time the reset switch is in an on state after the reboot of the processor, wherein the bootloader program provides a display signal indicating to a user that the reset switch is in the on state and wherein the display signal further indicates that if the reset switch continues to be in the on state, the electronic device will be reset to factory default.

15. An electronic device comprising:
    a reset switch;
    a processor;
    a one shot circuit coupled to the reset switch and for providing an output one shot signal in response to an activation of the reset switch;
    the processor having an input for determining a state of the reset switch using a bootloader program; and
    wherein the output one shot signal reboots the processor and the state of the reset switch is monitored by the bootloader program after the reboot of the processor to determine an amount of time the reset switch is an on state, wherein the bootloader program provides a display signal indicating to a user that the reset switch is in the on state and wherein the display signal further indicates that if the reset switch continues to be in the on state, the electronic device will be reset to factory default.

* * * * *